(12) United States Patent
Awadallah et al.

(10) Patent No.: US 10,896,186 B2
(45) Date of Patent: Jan. 19, 2021

(54) IDENTIFYING PREFERABLE RESULTS PAGES FROM NUMEROUS RESULTS PAGES

(71) Applicant: Microsoft Corporation, Redmond, WA (US)

(72) Inventors: Ahmed Hassan Awadallah, Redmond, WA (US); Imed Zitouni, Bellevue, WA (US); Frederic H. Behr, Jr., Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/319,744

(22) Filed: Jun. 30, 2014

(65) Prior Publication Data

US 2015/0379012 A1    Dec. 31, 2015

(51) Int. Cl.
*G06F 16/00* (2019.01)
*G06F 16/2457* (2019.01)
*G06F 16/9535* (2019.01)

(52) U.S. Cl.
CPC .... *G06F 16/24578* (2019.01); *G06F 16/9535* (2019.01)

(58) Field of Classification Search
CPC .......... G06F 17/3053; G06F 17/30864; G06F 17/3087; G06F 16/2457; G06F 16/9535; G06F 16/24544; G06F 16/00; G06F 16/24539; G06F 16/9536; G06F 16/2468; G06F 17/30; G06F 16/9024; G06F 16/24578; G06F 16/95; G06F 16/247573; G06F 16/2246; G06F 16/223; G06F 16/216; G06F 16/23; G06F 16/2237; G06F 17/30457; G06Q 30/02; G06Q 30/0601; G06Q 11/06
(Continued)

(56) References Cited

U.S. PATENT DOCUMENTS 7,519,605 B2    4/2009  Vailaya et al.
7,610,279 B2   10/2009  Budzik et al.
(Continued)

FOREIGN PATENT DOCUMENTS

CN           101477554 A       7/2009

OTHER PUBLICATIONS

Marquez, et al. "A Text Similarity Meta-Search Engine Based on Document Fingerprints and Search Results Records", In IEEE/WIC/ACM International Conference on Web Intelligence and Intelligent Agent Technology, Aug. 22, 2011, 8 pages.
(Continued)

*Primary Examiner* — Anh Ly
(74) *Attorney, Agent, or Firm* — Medley, Behrens & Lewis, LLC

(57) ABSTRACT

Described herein are technologies pertaining to determining which search engine results page (SERP), from a plurality of SERPs, is preferable to a user. A query is received, and multiple SERPS are retrieved based upon the query, wherein the multiple SERPs are generated independently from one another. Values of features of the query and the multiple SERPs are obtained, and a determination as to which of the SERPs from the multiple SERPs is preferable to the user is made based upon the values of the features. The SERP determined to be preferable over other SERPs in the multiple SERPs is presented to the user.

20 Claims, 7 Drawing Sheets

(58) Field of Classification Search
USPC .................................. 707/706, 722, 736
See application file for complete search history.

(56) References Cited

U.S. PATENT DOCUMENTS

| | | | |
|---|---|---|---|
| 7,930,286 | B2 | 4/2011 | Sue |
| 7,984,000 | B2* | 7/2011 | Heath et al. ............... 706/20 |
| 7,987,185 | B1* | 7/2011 | Mysen ............ G06F 16/951 707/733 |
| 8,301,615 | B1 | 10/2012 | Riley et al. |
| 2002/0165860 | A1 | 11/2002 | Glover et al. |
| 2006/0288001 | A1 | 12/2006 | Costa et al. |
| 2007/0208701 | A1* | 9/2007 | Sun .................. G06F 16/355 |
| 2009/0112781 | A1* | 4/2009 | Heath et al. ............... 706/21 |
| 2009/0112981 | A1* | 4/2009 | Markovich ........ G06Q 10/06 709/203 |
| 2009/0157652 | A1 | 6/2009 | Barbosa et al. |
| 2010/0057675 | A1 | 3/2010 | White et al. |
| 2010/0146012 | A1* | 6/2010 | Beaudreau ........ G06F 16/3326 707/803 |
| 2011/0082854 | A1* | 4/2011 | Eidson ........... G06F 16/24544 707/714 |
| 2011/0137883 | A1 | 6/2011 | Lagad et al. |
| 2011/0184941 | A1* | 7/2011 | El-Charif ........... G06F 16/248 707/723 |
| 2011/0231383 | A1 | 9/2011 | Smyth et al. |
| 2012/0030191 | A1 | 2/2012 | Zwicky et al. |
| 2013/0013408 | A1 | 1/2013 | Hjelm et al. |
| 2013/0031091 | A1* | 1/2013 | El Daher ........... G06F 16/957 707/723 |
| 2013/0191310 | A1* | 7/2013 | Awadallah ........... G06N 20/00 706/12 |
| 2013/0238609 | A1* | 9/2013 | Marantz et al. ............. 707/723 |
| 2013/0332438 | A1* | 12/2013 | Li et al. .................. 707/706 |
| 2015/0066902 | A1* | 3/2015 | Kim .................. G06F 16/248 707/722 |
| 2015/0278358 | A1* | 10/2015 | Abib et al. ............... 707/706 |
| 2015/0317309 | A1* | 11/2015 | Farrell ........... G06F 16/24578 707/725 |

OTHER PUBLICATIONS

"Different Engines, Different Results", Published on: Apr. 2007, Retreived at: <<http://csearchcdn1.inspcloud.com/dogpile/8.3.0.137/content/downloads/overlap-differentenginesdifferentresults.pdf?av=0137>>, 26 pages.

Ponnuswami, et al., "On Composition of a Federated Web Search Result Page: Using Online Users to Provide Pairwise Preference for Heterogeneous Verticals", In Proceedings of 4th International Conference on Web Search and Web Data Mining, Feb. 9, 2011, 10 pages.

Chuklin, et al., "Click Model-Based Information Retrieval Metrics", In Proceedings of 36th International ACM SIGIR Conference on Research and Development in Information Retrieval, Jul. 28, 2013, 10 pages.

Can, et al., "Automatic Performance Evaluation of Web Search Engines", In Proceedings of Information Processing and Management, vol. 40, No. 3, Jan. 2004, 20 pages.

Howe, et al., "SavvySearch: A Meta-Search Engine that Learns which Search Engines to Query", In Proceedings of AI Magazine, vol. 18, No. 2, Jan. 28, 1997, 12 pages.

"Written Opinion of the International Preliminary Examining Authority Issued in PCT Application No. PCT/US2015/037841", dated Jun. 3, 2016, 28 Pages.

"International Search Report and Written Opinion Issued in PCT Application No. PCT/US2015/037841", dated Sep. 23, 2015, 9 Pages.

"International Preliminary Report on Patentability Issued in PCT Application No. PCT/US2015/037841", dated Oct. 4, 2016, 13 Pages.

"Response to the International Search Report and Written Opinion Issued in PCT Application No. PCT/US2015/037841", dated Mar. 16, 2016, 9 Pages.

"Summon to Attend Oral Proceedings Issued in European Patent Application No. 15736132.0", dated May 29, 2020, 7 Pages.

* cited by examiner

IDENTIFYING PREFERABLE RESULTS PAGES FROM NUMEROUS RESULTS PAGES

BACKGROUND

Information retrieval is a difficult task, as often users set forth relatively ambiguous queries. There are currently numerous different search engines, at least some of which have respective vertical search engines therein, wherein a vertical search engine is configured to execute a search over a more specific domain than a general purpose web search engine. An exemplary vertical search engine includes a search engine that is configured to search over images. It can be ascertained that different search engines may perform differently for an identical query. Further, a user may prefer a first search engine for a first query while preferring a second search engine for a second query. Conventionally, the user selects a first search engine and sets forth a query to the first search engine, and the search engine generates a search engine results page (SERP) based upon the query. If the user is dissatisfied with the SERP, the user may access a second search engine and provide the second search engine with the query. This approach can be time consuming, as in some cases the user may be dissatisfied with the performance of both the first and the second search engine, and thus must again choose between the first search engine and the second search engine, and provide the chosen search engine with a reformulated query.

SUMMARY

The following is a brief summary of subject matter that is described in greater detail herein. This summary is not intended to be limiting as to the scope of the claims.

A computing system is disclosed herein, wherein the computing system includes a processor and a memory. The memory comprises a preference estimator system that is executed by the processor. The preference estimator system is configured to estimate a search engine results page (SERP) as being preferred over other SERPs in a plurality of SERPs, the plurality of SERPs generated based upon a query and independently from one another. The preference estimator system is further configured to output the SERP for display responsive to the SERP being identified.

DETAILED DESCRIPTION

Figures 1, 2:
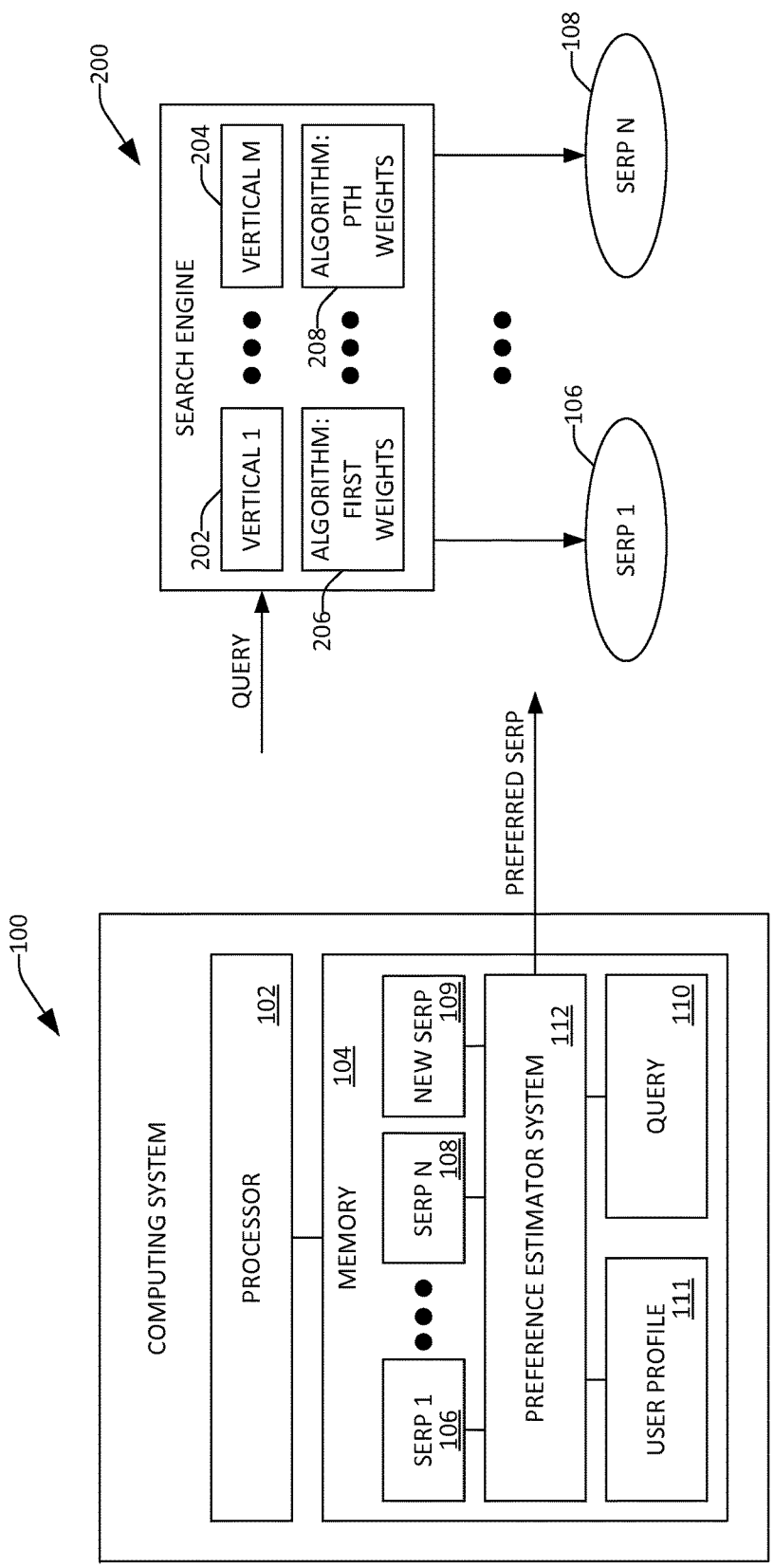
FIG. 1 is a functional block diagram of an exemplary computing system that facilitates estimating which search engine results page (SERP) from amongst a plurality of SERPs is preferable to a user who issues a query.
FIG. 2 is a functional block diagram of an exemplary search system that can output multiple SERPs.

Various technologies pertaining to identifying a preferable search engine results page (SERP) from amongst a plurality of SERPs are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary computing system 100 is illustrated, where the computing system 100 is configured to estimate which SERP from a plurality of SERPs is preferred by a user who issues a query. A SERP is a content page returned by a search engine based upon a received query. The SERP can include at least one search result that is identified by a search engine based upon the query. Oftentimes, the SERP will include several search results presented in a ranked list, with a most prominently displayed search result being what is identified by the search engine to be the most relevant search result to the query. A search result on the SERP can include a title that identifies the search result, a snippet that summarizes the search result, an image that is representative of the search result, a video that is representative of the search result, etc. In an example, the title may be in the form of a hyperlink, wherein upon selection of the hyperlink, a web browser or other suitable application is directed to retrieve content at a unified resource locator (URL) referenced in the hyperlink.

A SERP may also include an electronic communication that is configured to provide information to a user. For instance, the electronic communication may be an advertisement that is found to be relevant to the query. Thus, the query "seahawks" issued to a search engine may result in a SERP that includes an advertisement for purchasing tickets to a sporting event. The SERP may optionally include an "instant answer", where if the query issued by the user is fact-finding in nature, the search engine can locate the fact sought by the user and present the fact as an instant answer. For example, the user may issue the query "first president of the United States." Responsive to receiving the query, the search engine can output "George Washington" as an instant answer to the query, such that the user is immediately provided with the sought-after fact.

Still further, the SERP can include a named entity card when the query refers to a named entity. The named entity card can optionally include an image or other visual representation of the named entity referenced in the query. The named entity card can further optionally include values of attributes for the named entity. For instance, when the query is "George Washington", the named entity card may include an image of George Washington, date of birth of George Washington, date of death of George Washington, years of presidency, etc. Again, the named entity card allows the user to acquire information about an entity referenced in a query without the user needing to exit the SERP.

As can be ascertained, different search engines (including vertical search engines) will generate different SERPs for the same query. For example, a first search engine can receive a query and output a first SERP that includes first search results, while a second search engine can receive the same query and output a second SERP that includes second search results, which may be at least partially different from the first search results. Further, for instance, the first SERP may include an instant answer, while the second SERP may be free of an instant answer. Still further, the second SERP may include a named entity card, while the first SERP may be free of a named entity card. Moreover, different SERPs generated by different search engines may include different advertisements and/or types of advertisements. Accordingly, it can be ascertained that different SERPs generated by different search engines may be vastly different from one another. As indicated previously, the computing system 100 is configured to estimate which SERP from a plurality of SERPs is preferable to a user who issued a query, and is further configured to provide the user with the SERP estimated to be most preferable.

The computing system 100 includes a processor 102 and a memory 104 that is accessible to the processor 102. The memory 104 may include a plurality of SERPs 106-108 generated by a respective plurality of different search engines. A search engine can refer to a general-purpose web search engine, a vertical search engine (which is configured to search over documents (including images) in a constrained domain), a search algorithm that executes over a database of social network information, a search algorithm that executes over products or services for sale, etc. The plurality of SERPs 106-108 are generated by search engines based upon a query set forth by a user. Moreover, the plurality of SERPs 106-108 can be generated independently from one another. That is, for example, the nth SERP 108 is not a function of the first SERP 106—instead, the SERPs 106-108 are generated without regard for one another.

In another example, the memory 104 can include a new SERP 109, wherein the new SERP 109 may be generated based upon a combination of two or more of the SERPS 106-108. For example, the computing system 100 can be configured to receive two or more SERPs, and can construct the new SERP 109 is based upon the two or more SERPs. The new SERP 109 may include a first search result included in a first of the two or more SERPs (but not included in a second of the two or more SERPs), and the new SERP 109 may include a second search result included in a second of the two or more SERPs (but not included in the first of the two or more SERPs). Further, the new SERP 109 may include an "instant answer" from the first of the two or more SERPs, and a named entity card from the second of the two or more SERPs. While the memory depicts a single new SERP 109, it is to be understood that multiple SERPs can be constructed based upon combinations of elements in the SERPs 106-108.

The memory 104 can also include the query issued by a user, wherein the search engines generate the SERPs 106-108 based upon the query. As will be described in greater detail herein, the query 110 has features, and values of the features can be employed to estimate which of the SERPs 106-109 is preferable to the user that issued the query 110. The memory 104 can also optionally include a user profile 111 that includes information about the user. For instance, this information can include, but is not limited to, demographic information about the user and/or preferences of the user. The preferences of the user can be explicitly provided by the user or inferred based upon observations about activities of the user. For example, the user profile 111 can include data that is indicative of age of the user that issued the query, topics of interest to the user, observations about web pages historically viewed by the user, previous queries issued by user, etc. In another example, the user profile 111 can include information that is indicative of location of a home of the user, information that is indicative of location of work of the user, etc. It can be ascertained that the user profile 111, in an exemplary embodiment, may include information that is explicitly provided by the user or authorized by the user to be collected over time.

The computing system 100 additionally includes a preference estimator system 112 that determines (estimates) which one of the SERPs 106-109 the user will find preferable over others of the SERPs 106-109. The preference estimator system 112 causes the SERP determined to be preferable to be presented for display to the user. In an example, the preference estimator system 112 can determine which of the SERPs 106-109 is preferable to the user based upon values of features of the query 110, data in the user profile 111, and values of features of the SERPs 106-109.

As will be described in greater detail herein, the preference estimator system 112 can include at least one classifier that is configured to identify the SERP in the SERPs 106-109 that is most likely to be preferred by the user. For example, the classifier can be learned and/or trained based upon preferences between SERPs indicated by human judges. The human judges may set forth demographic information about themselves, such that the classifier can accord to particular demographic information (e.g., gender, ethnicity, age range, etc.). The classifier can be a binary classifier (e.g., no preference versus preference), which can utilize the features described herein (or a subset thereof and/or additional features) when determining which SERP in the SERPs 109 is preferable to the user. For instance, the classifier can employ various learning functions such as logistic regression, support vector machines, random forests, gradient boosted decision trees, or the like. Accordingly, the preference estimator system 112, when employing the classifier, can evaluate the query 110 and the corresponding SERPs 106-109 to determine if there is a quality difference (preference) therebetween. As the user interacts with the computing system 100, the classifier can be updated based upon explicitly provided or inferred user preferences with respect to SERPs. Accordingly, the preference estimator system 112 can be customized for the user. Furthermore, in instances where the computing system 100 identifies two or more SERPs that are believed to be equally preferable to the user, the computing system 100 can cause two or more SERPs to be simultaneously presented to the user and the user can manually indicate which of the provided SERPs is preferred over the other. The preference estimator system 112 may be updated based upon the preference indicated by the user.

In an example, the preference estimator system 112 can identify the SERP from the SERPs 106-109 estimated to be most preferable to the user, where the SERPs 106-108 can be from different engines, can be the n-best SERPs from a single search engine, or a combination. For example, a search engine can be configured to receive the query 110 and identify a plurality of search results (e.g., M search results) that are computed as being most relevant to the user based upon the query 110. The search engine can generate a plurality of SERPs that include subsets of the M search results, ordered differently. Thus, at least some of the SERPs 106-108 can be generated by the same search engine based upon the query 110. Further, the new SERP 109 can include an interleaving of results and/or elements from many SERPs and/or search engines. The preference estimator system 112 can identify a SERP in the SERPs 106-109 that is estimated to be preferable to the user, or can output n-best SERPs with scores (or confidences) assigned thereto, where n is a set threshold.

Now referring to FIG. 2, an exemplary search engine 200 is illustrated. The search engine 200 includes a plurality of vertical search engines 202-204. Vertical search engines 202-204 are configured to search over respective domains of web-accessible content. For example, the first vertical search engine 202 can be configured to search over news stories, a second vertical search engine can be configured to search over images, a third vertical search engine can be configured to search over videos, etc.

Additionally, the search engine 200 can include multiple search algorithms 206-208, which can weight query and/or document features differently. For example, the search algorithms 206-208 can be based upon a general search algorithm, and then customized for particular users and/or demographics. Therefore, for instance, the first algorithm 206 can assign first weights to query features and/or document features, and can output a first ranked list of search results based upon the first weights. Contrarily, the pth algorithm 208 can assign pth weights to query features and/or document features, and can output a pth ranked list of search results based upon the pth weights. Therefore, for example, the first algorithm 206 can output a first ranked list of search results based upon a query, while the pth algorithm 208 can output a pth ranked list of search results based upon the same query. Further, as indicated previously, the vertical search engines 202-204 and the algorithms 206-208 that assign different weights to features can generate search results independently from one another. Specifically, the search engine 200 can output the first SERP 106 through the nth SERP 108 based upon the query, where, for instance, one of the vertical search engines 202-204 outputs the first SERP 106 and one of the algorithms 206-208 outputs nth SERP 108.

Figure 3:
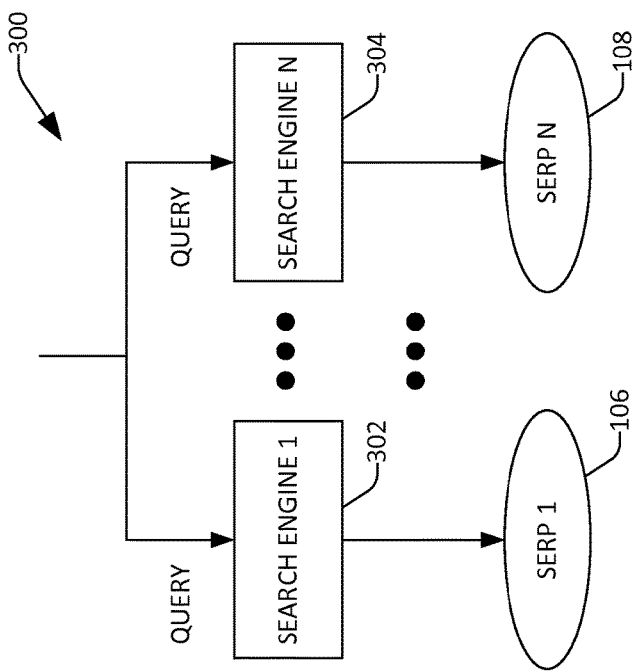
FIG. 3 is a functional block diagram illustrating multiple search engines outputting SERPs.

Now referring to FIG. 3, another exemplary system 300 that facilitates outputting the plurality of SERPs 106-108 is illustrated. The system 300 includes a first search engine 302 through an nth search engine 304. In an example, the search engines 302-304 may be general-purpose commercial search engines that are configured to output SERPs responsive to receipt of a query. In another example, the search engines 302-304 may be domain-specific, such as to search over content of a particular database or databases. In the example shown in FIG. 3, the first search engine 302 is configured to output the first SERP 106, while the nth search engine 304 is configured to output the nth SERP 108. As noted previously, the first search engine 302 generates the first SERP 106 independently of the second search engine 304 generating the nth SERP 108.

Figure 4:
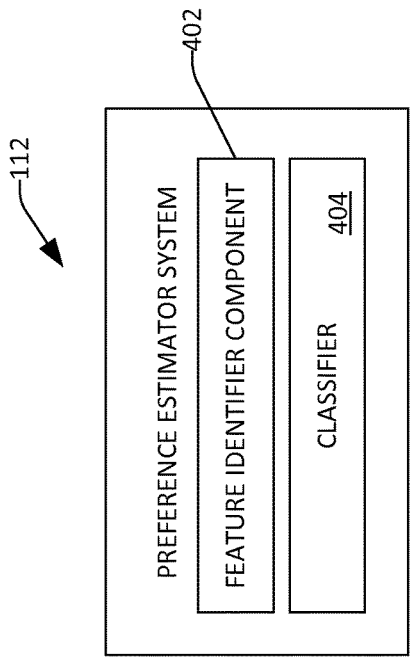
FIG. 4 is a functional block diagram of an exemplary preference estimator system that is configured to estimate which SERP from amongst a plurality of SERPs is preferable to a user who issues a query.

Now referring to FIG. 4, a functional block diagram of the preference estimator system 112 is illustrated. The preference estimator system 112 comprises a feature identifier component 402 that is configured to identify features of a received query, features of SERPs generated based upon the query (including features of documents referenced in a SERP), and/or features of the user that issued the query. Exemplary features that can be identified by the feature identifier component 402 are set forth below.

The preference estimator system 112 also includes a classifier 404 that can be configured to perform a plurality of classifications. While the classifier 404 is shown in FIG. 4 is being a single classifier, it is to be understood that the classifier 404 may represent multiple classifiers that are configured to perform different respective tasks. For example, a classifier can be configured to receive a pair of SERPs and output a value that is indicative of similarity in quality between the SERPs. The preference estimator system 112 can compare this value to a predefined threshold similarity value, and can identify the preferred SERP from the pair of SERPs based upon the comparison between the value computed by the classifier 404 and the threshold similarity value. For example, when the value computed by the classifier 404 indicates that there is a relatively large difference in quality between SERPs in a pair, then the classifier 404 can be further configured to identify which of the two SERPs is preferred. Alternatively, when the similarity value indicates that there is a relatively small difference in quality between the two SERPs, the preference estimator system 112 can be configured to select a default SERP from the SERPs (e.g., the SERP output by a default search engine). The classifier 404 can compute this quality similarity value based upon various features of SERPs in a pair of SERPs.

The classifier 404 can further be configured to output a value that indicates which SERP from amongst a plurality of SERPs is preferred by the user. To perform this task, the classifier 404 can utilize a plurality of features. In an example, the classifier 404 can be configured to do a pairwise analysis over pairs of SERPs in the plurality of SERPs 106-109. In another example, the classifier 404 can be configured to perform a one-to-many comparison between SERPs in the plurality of SERPs 106-109. Furthermore, the classifier 404 can consider information about the user when identifying which of the SERPs 106-109 the user will prefer. The preference estimator system 112 then causes the SERP found to be most preferable to from amongst the plurality of SERPs 106-109 (based upon the query) to be displayed, and the user can interact with items on the SERP.

As referenced above, the classifier 404 can consider numerous features when computing the similarity value and when determining which SERP from amongst numerous SERPs will be most preferable to the user. Such features can include, but are not limited to, a number of search results in the SERPs, whether or not the SERPs include a named entity card, whether or not the SERPs include an instant answer, whether or not the SERPs include an image, etc. Other features that can be contemplated by the classifier 404 are set forth below.

Additional exemplary features can include: 1) query features; 2) relevance features; 3) click-based features; 4) features of titles; 5) features of snippets; 6) diversity features; amongst others. Various feature values can representative of a SERP, and thus can be representative of differences between SERPs. Many features are described in the following examples. It is to be appreciated that a combination of values of such features can be utilized by the preference estimator system 112. Moreover, additional features other than the features disclosed herein can be utilized by the search preference estimator system 112. Still further, features set forth below need not be employed by the preference estimator system 112.

As noted above, the features can include query features. Search queries can have various characteristics which may affect user perception of preference. For example, users may value diversity more than other dimensions for a particular group of queries. For another group of queries, relevance may be more important. To capture these variations in preference dimensions, a list of features can be used to describe the query of interest. Below are examples of query features that can be analyzed by the preference estimator system 112.

Query Length: a Query Length feature is a feature of the query string itself, and can include: 1) a number of characters in the query; and 2) a number of tokens in the query.

Query Type: a Query Type feature can indicate whether the query is a navigational query or informational query. Navigational queries can be used to reach a particular site, while informational queries can be used to acquire information. Hence, users submitting a navigational query are likely interested in finding a particular site in the search results, where users submitting informational queries may be interested in multiple relevant results with useful information.

Query Topic: Queries can also be categorized into different topical categories. Topical categories can allow the classifier 404 to handle signals differently for different topics. For example, for a query categorized as being a news query, freshness may likely be more important than queries categorized in other topics. To assign topical categories to queries, the Open Directory Project (ODP) can be used. The ODP uses a hierarchical scheme for organizing URLs into categories and subcategories. ODP categories can be assigned to queries based on ODP categories of URLs that have been clicked or returned for such query. Queries belonging to multiple topical categories can be permitted by defining a topic distribution over classes rather than assigning every query to a single category. The foregoing may be useful when result documents can have multiple aspects.

Query History: Historic features of queries, such as query frequency in logs of a commercial search engine and an average result clickthrough rate (CTR) for the query can be used. A result clickthrough rate can be a number of times a result has been clicked divided by total number of impressions. The clickthrough rate can be calculated for clicks with dwell times larger than a threshold length of time (e.g., 30 seconds), referred to as long CTR, which can be correlated with satisfaction. The signals can be used as a proxy for query popularity and query difficulty.

Moreover, as noted above, the features can include relevance features. For instance, standard relevance judgments can be on a five-point scale with values (perfect, excellent, good, fair, bad) used for query-document pairs to derive a set of relevance features. The following are examples of relevance features that can be identified by the feature identifier component 402 and evaluated by the preference estimator system 112.

Relevance@N: The relevance of every URL at positions 1 through 10 in the search results as well as differences in relevance between search results in a pair of SERPs.

Precision@N: The precision can be a fraction of documents in a SERP that are relevant to the query. Relevant documents are documents with a relevance rating of perfect, excellent, or good. Precisions at 1, 3, 5 and 10 for both sides, as well as deltas between them, can be computed.

DCG@N: Discounted Cumulative Gain (DCG) can be a position-weighted mean of the relevance of a document. Given relevance judgments on a five-point scale, DCG can be computed as follows:

$$DCG@N = rel_1 + \sum_{i=2}^{N} \frac{rel_i}{\log_2(i)}$$

In the foregoing, N is a particular rank position. DCG can incorporate results to arbitrary ranks, though DCG at ranks 1, 3, 5, and 10 may commonly be used. DCG at 1, 3, 5, and 10 can be computed at both sides as well as deltas between them.

NDCP@N: Normalized DCG (NDCG) can be a normalized form of DCG that can be computed by dividing DCG by an ideal DCG (IDCG). The ideal DCG can be obtained by sorting documents of a result list by relevance and computing the DCG. Hence, IDCG can be a maximum possible DCG for a query and a result list in a SERP. Like DCG, NDCG can be computed at 1, 3, 5, and 10 for both sides.

Best@N: The relevance label of the best document for every list at different positions can be computed (e.g., label of the best document in the top N results). Further, this value can be used for both sides as features.

Worst@N: Similar to Best@N, the relevance label of the worst document for every list at different positions can be computed. This value can be used for both sides as features.

Perfect/Excellent/Bad ratio: The existence of very good or very bad results on a search result page can affect user perception of SERP quality, which can affect the user's preference judgment. To capture such behavior, a percentage of results with perfect, excellent, or bad labels can be used as features.

In the foregoing, "@N" can denote that the metrics are evaluated on top N documents. The value of metrics can be computed for all SERPs being considered.

Further, the features evaluated by the preference estimator system 112 can include clicked-based features. Click information can be used to derive a relevance signal. Click dwell time (e.g., time spent on a landing page before returning to the search engine) can be correlated with satisfaction. For instance, clicks with dwell times exceeding 30 seconds (e.g., a threshold length of time) can be correlated with satisfaction. Accordingly, click data can be used to build features that can be used instead of, or in addition to, features computed from relevance judgments.

Click-based relevance judgments can be obtained using a log-based technique; thus, relevance judgments for query document pairs can be inferred from search result clicks. Three types of clicks can be considered in labeling user feedback in the logs; long clicks, short clicks and no clicks. A long click can be defined as either a click with dwell time of 30 seconds or more or a last result click in a session. Clicks with dwell times shorter than 30 seconds can be considered short clicks.

According to an example, one of three rating labels can be assigned to each query document pair in each impression. If a document received at least one long click, it can be labeled as a 2. If a document received only short clicks, it can be labeled with a 1. If a document was not clicked at all, it can be labeled with a 0. The foregoing can provide a three-level judgment for each query document pair and each impression. To assign a single value for query document pairs with multiple impressions, a median of impressions can be computed. Relevance features described above can further be recomputed using the three-point scale inferred from the click data. A label of 2 can denote a perfect result, while a label of 0 can denote a bad result. Additionally, the click-through rate (CTR), number of times a result has been clicked divided by the total number of its impressions, and the long clickthrough rates (long CTR), considering only clicks with dwell times of 30 seconds or more, for each query document pairs can be considered as features.

Further, the features can also include title and/or snippet features. Search engines can display several pieces of information for each search result. The pieces of information can include the URL of a web page, the title of the web page, and a snippet from the web page. The snippet is a brief summary that describes the content of the web page. Snippets commonly can be extracted from the web page itself, but may also be taken from other sources, such as Web directories. The URL, title, and snippet can vary across SERPS. For example, some SERPs may not have a snippet, others may have longer/shorter snippets compared to other SERPs, etc. Moreover, some terms in the URL, title, and snippet can be bolded while others are not. Further, a number of bolded terms can vary across SERPs. The number of terms that match the query terms can also vary. Below are various examples of title and/or snippet features that can be evaluated by the preference estimator system 112.

Highlighted Terms: Highlighted terms in titles and snippets can affect user behavior by drawing attention of a user to specific results. A number of highlighted terms in each result, as well as a minimum, maximum, and average number of highlighted terms for the SERP, can be used as features. Such values can be computed for the URL, the title, and the snippet. The highlighted terms need not appear in the query because search engines sometimes highlight terms that may be relevant to the query even if not a query term.

Text Length: Length of the titles and the snippets in terms of number of characters and number of words can also be used as features. Result level and list level (minimum, maximum and average) can be used like other features.

Readability Level: Title and caption readability levels can be used as a signal to predict search result quality. Readability of text can be assessed using a vocabulary-based technique. For instance, the Dale-Chall readability measure that computes a fraction of unknown words in text relative to the Dale word list can be used. This feature can be computed for the titles and snippets of results. The average, minimum, and maximum values can be used to assess readability level of a SERP.

Term Match: Features that characterize the relation between the query and the URL, title, and snippet of results can also be used. For instance, standard normalization can be performed, where letters are replaced with corresponding lowercase representation. Further, runs of whitespace characters can be replaced with a single space, and leading or trailing spaces can be removed. Text normalization can be applied to queries, URLs, titles, and snippets. In addition to the standard normalization, queries that do not respect word boundaries can be broken into words. Word breaking can be useful for natural language processing applications, which can be a problem with queries when users do not observe the cracked word boundaries (e.g., "southjerseyhighschoolbaseball" for "south jersey high school baseball") or when users are searching for a part of the URL (e.g., "quincycollege" for "quincy college"). For instance, word breaking can be applied to queries and URLs.

Following text normalization and word breaking, stop words can be removed from text and a number of query terms that exist in the URL, title, or snippet of each result can be computed. Term matching can be performed in various manners. For instance, exact match or approximate match can be determined. Exact match can be when two terms are identical. The objective of approximate match can be to capture spelling variance and misspellings. For instance, this can be performed by allowing two terms to match if the Levenshtein edit distance between such words is less than two.

Phrase Match: In addition to matching terms, phrases can be matched. For example, for the query "new york weather", a snippet with the phrase "new york" can be rewarded, while another snippet with the phrase "new mexico" is not rewarded just because it includes the term "new".

For phrase matching, each query can be segmented into phrases. Query segmentation can include taking a user's search query and dividing the tokens into individual phrases or semantic units. Queries, URLs, titles, and snippets can be segmented into phrases by computing point-wise mutual information scores for each pair of consecutive words. A segment break can be introduced whenever the point wise mutual information between two consecutive words drops below a certain threshold $\tau$. The threshold, for instance, can be $\tau=0.895$; such threshold can be selected to maximize break accuracy on the Bergsma-Wang-Corpus. Like term matching, the phrase match can be computed between the query and the URL, title, and snippet for each result. Likewise, exact matching and approximate matching can be used as described above for term matching features. Features to describe each result, as well as a minimum, maximum, and average over the SERP, can be used.

Further, as noted above, the features can include diversity features. Evaluation techniques that use a query-document pair as the unit of the evaluation can focus on query-document relevance. However, when evaluating a SERP that includes multiple search results, other aspects can be taken into consideration, such as diversity. Diversity in search results can be assessed by the feature identifier component 402 to obtain values of one or more of the following features.

Domain Diversity: A distribution of domain names of results in the SERP can be built. To assess diversity, the domain distribution, richness, and entropy can be assessed. Richness can quantify how many different types (e.g., domains) exist in the data set. For example, if the 10 results belong to 10 different domains, the richness can be 10, while if two results among the 10 belong to the same domain, the richness can be 9. A second measure can be a Shannon entropy of the domain distribution. Entropy can quantify uncertainty of information content. Accordingly, the more different types there are, the more equal their probability and the more difficult it may be to predict an unseen one. Entropy can often be computed as follows:

$$H = -\Sigma_{i=1}^{n} p_i \ln p_i$$

In the foregoing, where $p_i$ is a proportion of results belonging to the $i^{th}$ domain and n is a number of unique domains in a data set.

ODP Diversity: Similar to domain diversity, richness and entropy with respect to the distributions of results' ODP categories can be computed. Automatic classification of URLs into ODP categories can be performed. URLs in the directory can be correctly classified, while missing URLs can be incrementally pruned, one level at a time, until a match is found or is declared as a miss. The first three levels of the ODP hierarchy can be used to represent each URL (e.g., Recreation: Travel: Transportation).

Text Diversity: The domain and ODP diversity features can attempt to predict and assign the page topicality, and can be used to assess diversity. Diversity estimation can also be assessed by looking at similarity between the text of the title and snippet of each result to estimate text diversity. The Jaccard coefficient and cosine similarity can be used. To compute the Jaccard coefficient, each result can be represented as a set of terms that occurred in its title and snippet after removing stop words. The Jaccard coefficient between a pair of SERPs can be computed as follows:

$$J(A, B) = \frac{|A \cap B|}{|A \cup B|}$$

In the foregoing, A and B are sets of terms in the two results. This value can be computed for pairs and then the average can be computed. Additionally, the cosine similarity can be computed between text representations of results. Using the terms in the title and snippet, each result can be represented as a T-dimensional vector, where T is a number of unique terms across results. Similarity between two vectors can be estimated by computing the cosine of the angle between the two vectors. The average similarity over pairs can then be computed and used as a proxy for result list diversity. Again, as referenced above, other features may also be used.

In summary, the preference estimator system 112 can select the "best" SERP from the plurality of SERPs 106-109, wherein the preference estimator system 112 selects the SERP is based upon the information retrieval need of the user (e.g., the query) and personal preferences of the user. The personal preferences can be learned and adjusted based upon observations made about the user or information explicitly provided by the user. For example, the user can be asked about her preferences on an initial data set. Additionally or alternatively, information about user preferences can be inferred based upon search results clicked by the user, time spent on particular pages when browsing web pages, location of the user, readability level of the user, etc.

In an example, for the user U, a query Q can be received, and at least a pair of SERPs ($S_1$, $S_2$) can be received. The preference estimator system 112 (e.g., the classifier 404) detects the degree of similarity between $S_1$ and $S_2$ given (Q, U): $P_{similar}(Q, U|S_1, S_2)$. When the classifier 404 determines that $S_1$ and $S_2$ are not similar (e.g., of not of similar quality), the classifier 404 (or another classifier) can analyze $S_1$ and $S_2$ to ascertain which of the SERPs will be more preferable to the user: $P_{Better}(Q, U|S_1, S_2)$. Again, as mentioned above, the classifier 404 can be a joint (single) classifier that predicts which SERP is going to be more preferable by the user, and can further detect whether SERPs are similar. SERPs for many search engines can be compared to each other (one-to-one or one-to-many), and a winner SERP can be presented to the user. The selection of the SERP can be based upon user preferences about several features including, but not limited to, relevance, freshness, locality, authority, and the like.

From the foregoing, it can be ascertained that the preference estimator system 112 can identify a SERP from the SERPs 106-108 that is believed to be preferable to the user, wherein the SERPs 106-108 are natively generated by a search engine or search engines. As indicated previously, the computing system 100 may optionally be configured to construct the new SERP 109 (or multiple new SERPs), wherein the new SERP 109 can include an interleaving of elements from different SERPs in the SERPs 106-108. When the new SERP 109 is included in the memory 104, the preference estimator system 112 can, for example, determine that the new SERP 109 is most likely to be preferred by the user over the SERPs 106-108.

Figure 5:
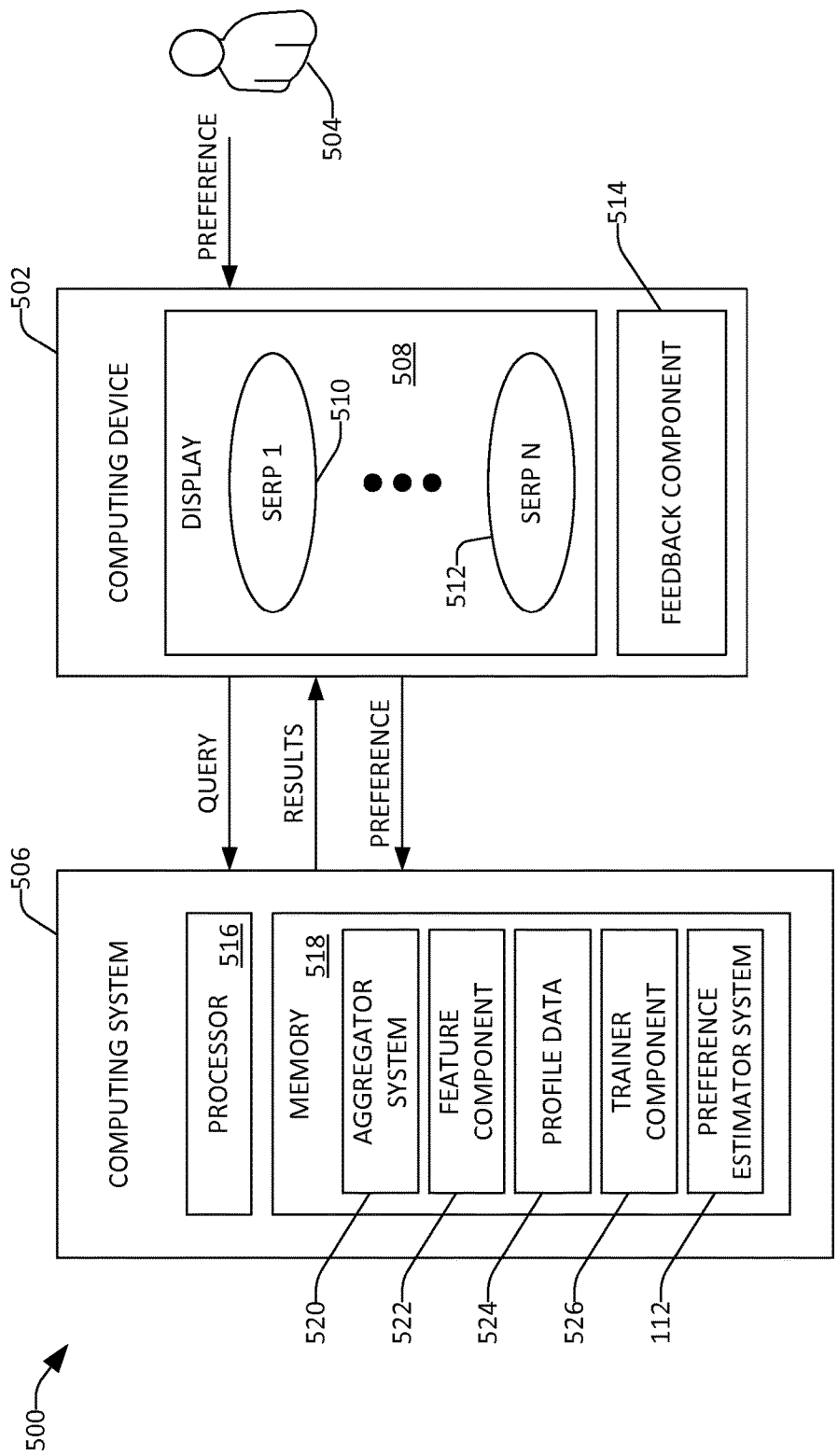
FIG. 5 is a functional block diagram of an exemplary system that facilitates learning a classifier based upon user-specified preferences about SERPs.

Now referring to FIG. 5, an exemplary system 500 that facilitates learning and/or updating the preference estimator system 112 is illustrated. The computing system 500 includes a computing device 502 that is employed by a human 504. The human 504 may be the user referenced above, or a human judge that provides feedback as to which SERP from amongst a plurality of SERPs the human 504 prefers. The system 500 also includes a computing system 506 that is in communication with the computing device 502. The computing system 506 may be a computing device or a distributed computing system, such as an enterprise computing system, a data center, etc.

The computing device 502 includes a display 508 upon which a plurality of SERPs 510-512 can be displayed. The computing device 502 also includes a feedback component 514 that is configured to receive feedback from the human 504 as to which SERP, from the plurality of SERPs 510-512, is preferred by the human 504.

The computing system 506 includes a processor 516 and a memory 518 that includes systems and/or components that are executable by the processor 516. In more detail, the memory 518 includes an aggregator system 520 that is configured to retrieve SERPs from a plurality of search engines. The memory 518 also includes a feature component 522 that is configured to obtain values for features in queries submitted to the search engines referenced above, as well as to obtain values for features of SERPs returned by the search engines. The memory 518 can also include profile data 524, which includes information about the human 504 including, but not limited to, location of the human 504, topical preferences of the human 504, age of the human 504, amongst other information about the human 504. The memory 518 further includes a trainer component 526 that is configured to learn and/or update the preference estimator system 112 (e.g., the classifier 404). The trainer component 526 can learn and/or update the preference estimator system 112 based upon feature values obtained by the feature component 522 and preferences set forth by the human 504.

Operation of the system 500 will now be set forth. The human 504, in an example, can use the computing device 502 to access the aggregator system 520. The human 504 can set forth a query to the computing device 502, which can then be transmitted to the computing system 506. The aggregator system 520 receives the query and, for example, transmits the query to multiple search engines. Pursuant to an example, the aggregator system 520 can reformulate the query prior to transmitting the query to the search engines. For instance, the aggregator system 520 can reformulate the query to add attributes about the human 504, such as the location of the human. Therefore, in an example, if the human 504 sets forth the query "restaurants," the aggregator system 520 can reformulate the query to include a current location of the human 504 (e.g., can reformulate the query to be "Seattle restaurants"). The aggregator system 520 retrieves a plurality of SERPs from the respective plurality of search engines. The feature component 522 identifies values of respective features of the query, identifies values of respective features of the SERPs, and identifies attributes of the human 504 (e.g., from the profile data 524). The aggregator system 520 causes the computing system 506 to transmit the SERPs 510-512 to the computing device 502 employed by the human 504, where the SERPs 510-512 are displayed on the display 508.

The human 504 can review the SERPs 510-512 and can set forth an indication as to which of the SERPs 510-512 the human 504 prefers (e.g., based upon the information need of the human 504 represented by the query). The feedback component 514 can receive such feedback and can transmit the noted preference to the computing system 506. Effectively, this preference set forth by the human 504 is the target of learning. The trainer component 526 receives the preference set forth by the human 504, as well as the values of features identified by the feature component 522. The trainer component 526 can receive multiple preference judgments from many human judges using varying queries that retrieve differing SERPs and can, for example, optimize the classifier 404 based upon such information.

The system 500 can be well-suited in connection with initially learning the preference estimator system 112. In such an example, many human judges may be employed to provide several preference judgments. Additionally, the system 500 may be well-suited in connection with updating an existing preference estimator system using active feedback. For example, as indicated above, the classifier 404 can determine that it is difficult to ascertain a quality difference between two SERPs from the perspective of the human 504. In such case, the classifier 404 can cause the aggregator system 520 to transmit the SERPs found to have similar quality for display on the display 508, and can request that the human 504 provide feedback as to which of the SERPs the human 504 prefers. The human 504 can make the preference judgment, and the preference can be transmitted to the trainer component 526, which can update the preference estimator system 112 to be customized for the human 504 and/or a demographic that includes the human 504.

Figure 6:
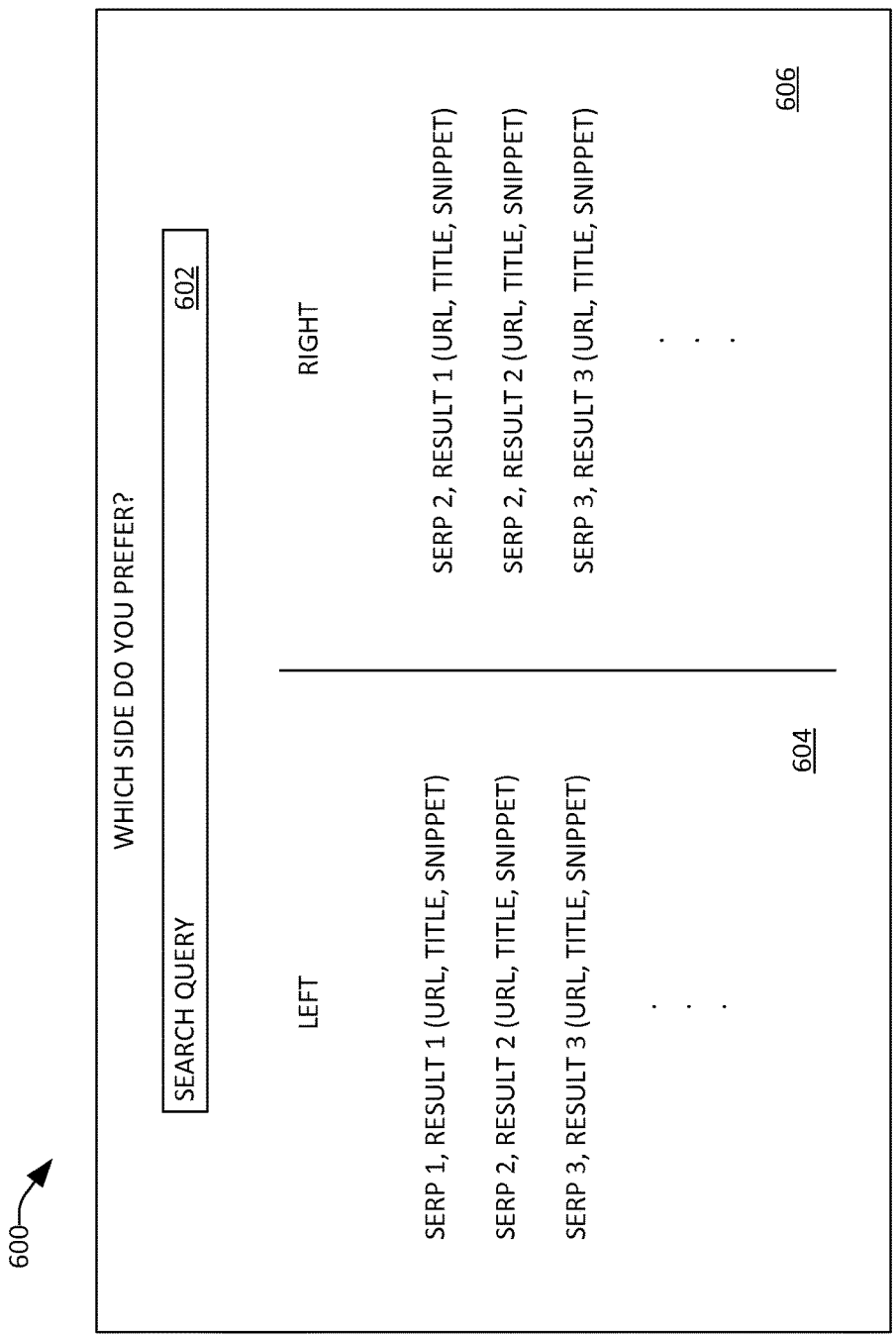
FIG. 6 is an exemplary graphical user interface that illustrates SERPs based upon a query, the SERPs presented in a side-by-side manner.

Now referring to FIG. 6, an exemplary graphical user interface 600 that can be displayed on the display 508 is illustrated. The graphical user interface 600 includes a search field 602 that displays a search query proffered by the human 504 (or automatically generated during a testing phase). The graphical user interface 600 includes a first SERP 604 and a second SERP 606 shown in a side-by-side manner. The human 504 can view the graphical user interface 600 and identify which of the SERPs 604 or 606 is preferred by the human 504. As indicated, each of the SERPs 604-606 can include a respective ranked list of search results, wherein each search result can include, but is not limited to, including a URL, a title, and a snippet. Additionally, while not shown, one or more of the SERPs 604 or 606 can include an image, a map, an entity card, an instant answer, etc. The human 504 sets forth a preference judgment as to which of the SERPs 604 or 606 is preferred by the human 504, and the trainer component 526 can learn and/or update the preference estimator system 112 based upon the indication received from the human 504.

Figure 7:
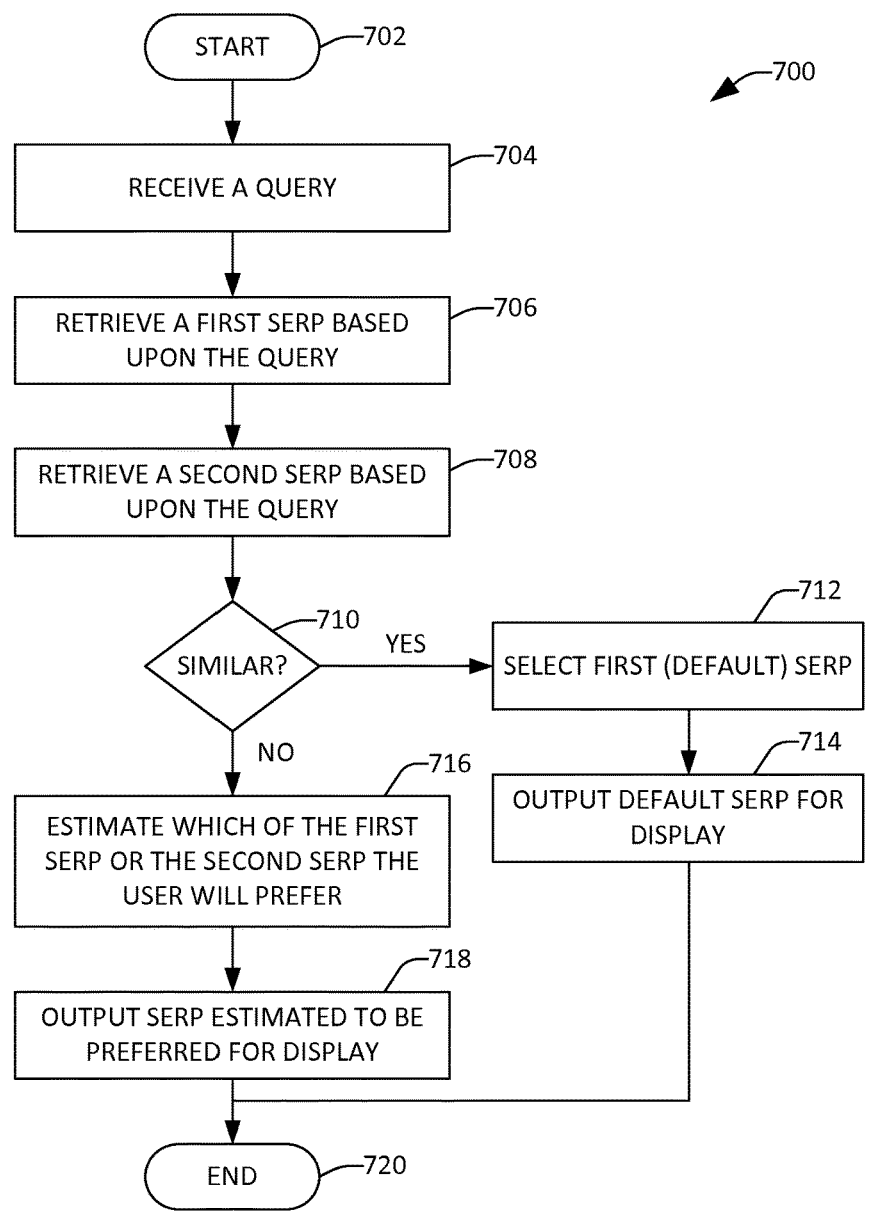
FIG. 7 is a flow diagram that illustrates an exemplary methodology for estimating which SERP in a pair of SERPs is preferable to a user who issues a query.
Figure 8:
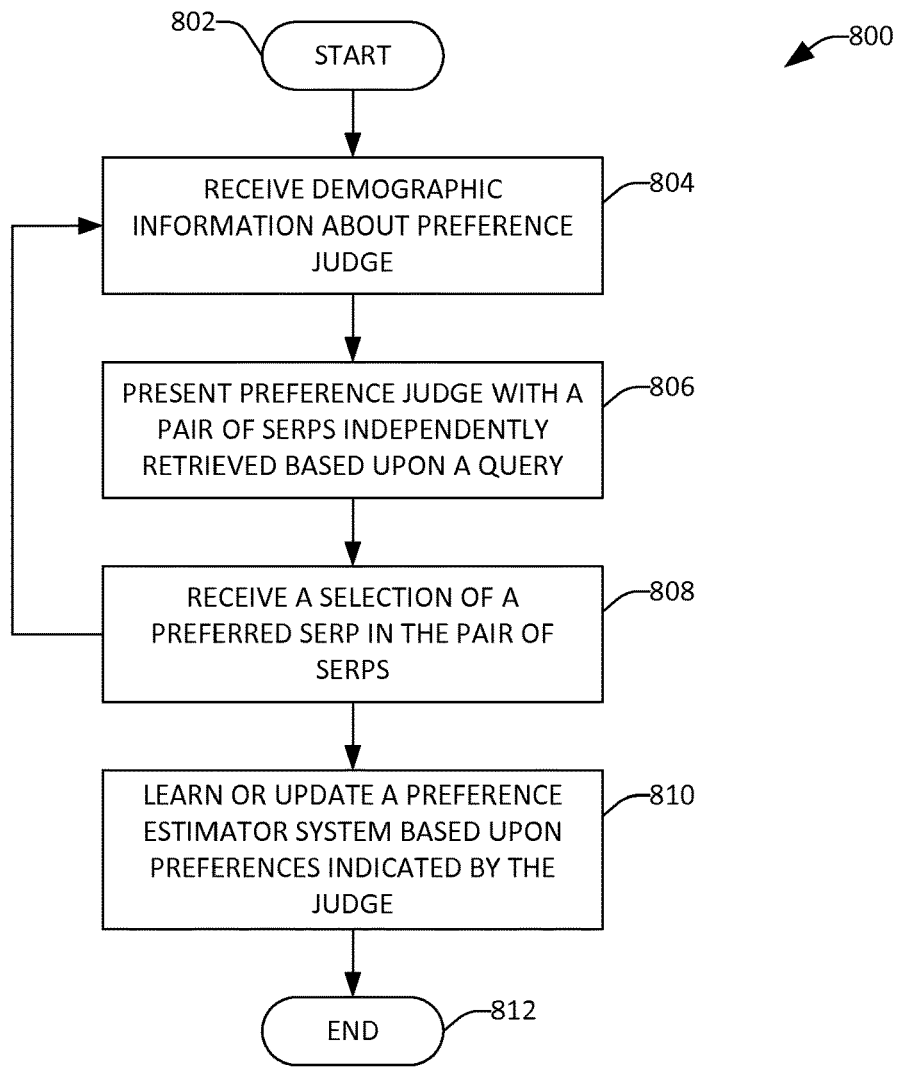
FIG. 8 is a flow diagram illustrating an exemplary methodology for learning and/or updating a preference estimator system based upon preferences about SERPs set forth by human judges.

FIGS. 7-8 illustrate exemplary methodologies relating to determining which SERP from a plurality of SERPs is preferred by a user. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Turning now to FIG. 7, an exemplary methodology 700 that is configured to output a SERP that is determined to be most preferable from amongst a plurality of SERPs is illustrated. The methodology 700 starts at 702, and at 704, a query is received. At 706, a first SERP is retrieved based upon the query. For example, the first SERP can be retrieved from a first general-purpose search engine. In another example, the first SERP can be retrieved from a vertical search engine. At 708, a second SERP is retrieved based upon the query. For instance, the second SERP can be retrieved from a second general-purpose search engine or a second vertical search engine.

At 710, a determination is made as to whether the first SERP retrieved at 706 and the second SERP retrieved at 708 are of similar quality. For instance, a classifier can be trained to make a binary classification: a first classification when the first SERP and the second SERP are of similar quality; and a second classification when the first SERP and the second SERP are not of similar quality. In another example, an algorithm can be configured to generate a value that is indicative of similarity between the first SERP and the second SERP. For instance, the algorithm may be a distance-based algorithm, wherein vectors can represent the SERPs and a distance between such vectors can be computed. When such value is above a predefined similarity value (e.g., the first SERP and the second SERP are fairly similar to one another), then the methodology 700 can continue at 712, where the first SERP is selected. For example, the first SERP can be generated by a default search engine. At 714, the first SERP is output for display.

If at 710, it is found that the first SERP and the second SERP are somewhat dissimilar, then at 716, an estimation is made as to which of the first SERP or the second SERP will be preferred by the user that issued the query received at 704. Step 716 can be performed, for example, by a classifier that outputs a binary value that indicates which of the first or second SERP will be preferred by the user. At 718, the SERP estimated to be preferred by the user is output for display. The methodology 700 completes at 720.

Now referring to FIG. 8, an exemplary methodology 800 that facilitates learning and/or updating a preference estimator system is illustrated. The methodology 800 starts at 802, and at 804, demographic information about a preference judge is received. This demographic information can indicate, for example, an age of the preference judge, a gender of the preference judge, a location of the preference judge, etc. At 806, the preference judge is presented with a pair of SERPs that are retrieved based upon the query, wherein the SERPs are generated independently from one another. At 808, a selection of a preferred SERP in the pair of SERPs is received. For example, the preference judge can indicate which SERP in the pair of SERPs is preferred by the preference judge. The methodology 800 can optionally return to 804, where information about various queries, SERPs, etc. can be collected and used for training purposes. At 810, a preference estimator system is learned and/or updated based upon the preferences indicated by the judge. The purpose of the learning and/or updating can be to identify which features should be most heavily weighted when identifying what differentiates between a good and bad SERP from the perspective of the human judge, humans sharing demographic information with the judge, etc. The methodology 800 completes at 812.

Various Examples Are Now Set Forth

EXAMPLE 1

A computing system comprising: a processor; and a memory that comprises a preference estimator system that is executed by the processor, the preference estimator system configured to: estimate a search engine results page (SERP) as being preferred over other SERPs in a plurality of SERPs, the plurality of SERPs generated based upon a query and independently from one another; and output the SERP for display responsive to the SERP being identified.

EXAMPLE 2

The computing system according to example 1, the SERP generated by a first search engine, and at least one other SERP in the plurality of SERPs generated by a second search engine.

EXAMPLE 3

The computing system according to example 1, the SERP generated by a search engine, and at least one other SERP in the plurality of SERPs generated by the search engine.

EXAMPLE 4

The computing system according to example 3, the search engine comprises a search algorithm, the SERP includes first search results ranked by the search algorithm when the search algorithm has a first set of weights assigned thereto, the at least one other SERP includes second search results ranked by the search algorithm when the search algorithm has a second set of weights assigned thereto.

EXAMPLE 5

The computing system according to example 1, the SERP generated by one of a general purpose search engine or a first vertical search engine, the at least one other SERP generated by a second search engine vertical.

EXAMPLE 6

The computing system according to any of examples 1-5, the preference estimator system estimates the SERP as being preferred over the other SERPs in the plurality of SERPs based upon a profile of a user being provided the SERP.

EXAMPLE 7

The computing system according to example 6, the profile being indicative of at least one of age or gender of the user.

EXAMPLE 8

The computing system according to any of examples 1-7, the preference estimator system estimates the SERP as being preferred over the other SERPs in the plurality of SERPs based upon historically observed preferences between SERPS in respective pairs of SERPs as set forth by a user being provided with the SERP.

EXAMPLE 9

The computing system according to any of examples 1-8, wherein the preference estimator system comprises a feature identifier component that identifies first respective values of features of the query and second respective values for features of search results in each SERP of the plurality of SERPS, the preference estimator component estimates that the SERP is preferred over the other SERPs in the plurality of SERPs based upon the first respective values and the second respective values.

EXAMPLE 10

The computing system according to claim 9, the first respective values including at least one of a number of characters in the query, a number of keywords in the query, a type assigned to the query, a category assigned to the query, a frequency of issuance of the query, or an average result click through rate for the query.

EXAMPLE 11

The computing system according to any of examples 9-10, the second respective values including, for each SERP in the plurality of SERPs, relevance values assigned to search results in a respective SERP, a fraction of the search results in the respective SERP identified as being relevant to the query, or position-weighted mean relevance scores assigned to search results in the respective SERP.

EXAMPLE 12

The computing system according to any of examples 9-11, wherein the preference estimator system comprises a classifier that is configured, for each pair of SERPs in the plurality of SERPs, to output a value that is indicative of similarity in quality of SERPs in each pair of SERPs, the preference estimator system estimates that the SERP is preferred over the other SERPs in the plurality of SERPs based upon the value.

EXAMPLE 13

A method comprising: determining that a first search engine results page (SERP) is preferable over a second SERP, the first SERP and second SERP generated based upon a query, the first SERP generated independently from the second SERP; and outputting the first SERP for display responsive to determining that the first SERP is preferable over the second SERP.

EXAMPLE 14

The method according to example 13, further comprising: receiving the first SERP from a first search engine; receiving the second SERP from a second search engine; and determining that the first SERP is preferable over the second SERP responsive to receiving the first SERP from the first search engine and further responsive to receiving the second SERP from the second search engine.

EXAMPLE 15

The method according to any of examples 13-14, wherein determining that the first SERP is preferable over the second SERP comprises: computing a value that is indicative of a similarity in quality between the first SERP and the second SERP; and determining that the first SERP is preferable over the second SERP based upon the value.

EXAMPLE 16

The method according to example 15, wherein determining that the first SERP is preferable over the second SERP further comprises: comparing the value to a predefined threshold value; identifying that the value is above the predefined threshold value; and determining that the first SERP is preferable over the second SERP based upon the value being above the predefined threshold value.

EXAMPLE 17

The method according to any of examples 13-16, wherein determining that the first SERP is preferable over the second SERP comprises: providing the first SERP and the second SERP to a classifier; and receiving an indication from the classifier that the first SERP is preferable over the second SERP.

EXAMPLE 18

The method according to any of examples 13-17, further comprising: determining that the first SERP is preferable over multiple other SERPs, the multiple other SERPs based upon the query and generated independently from one another.

Example 19

The method according to any of examples 13-18, wherein determining that the first SERP is preferable over the second SERP is based upon diversity between search results in the first SERP and diversity between search results in the second SERP.

EXAMPLE 20

A computer-readable storage medium comprising instructions that, when executed by a processor, cause the processor to perform acts comprising: receiving a query; responsive to receiving the query, retrieving a plurality of search engine results pages (SERPs) that are generated based upon the query, the plurality of SERPs generated independently from one another; determining that a SERP in the plurality of SERPs is preferable over other SERPs in the plurality of SERPs based upon at least one feature value for the query and at least one feature value for the SERP; and outputting the SERP for display responsive to determining that the SERP is preferable over other SERPs in the plurality of SERPs.

EXAMPLE 21

A system comprising: means for determining that a first search engine results page (SERP) is preferable over a second SERP, the first SERP and second SERP generated based upon a query, the first SERP generated independently from the second SERP; and means for outputting the first SERP for display responsive to determining that the first SERP is preferable over the second SERP.

Figure 9:
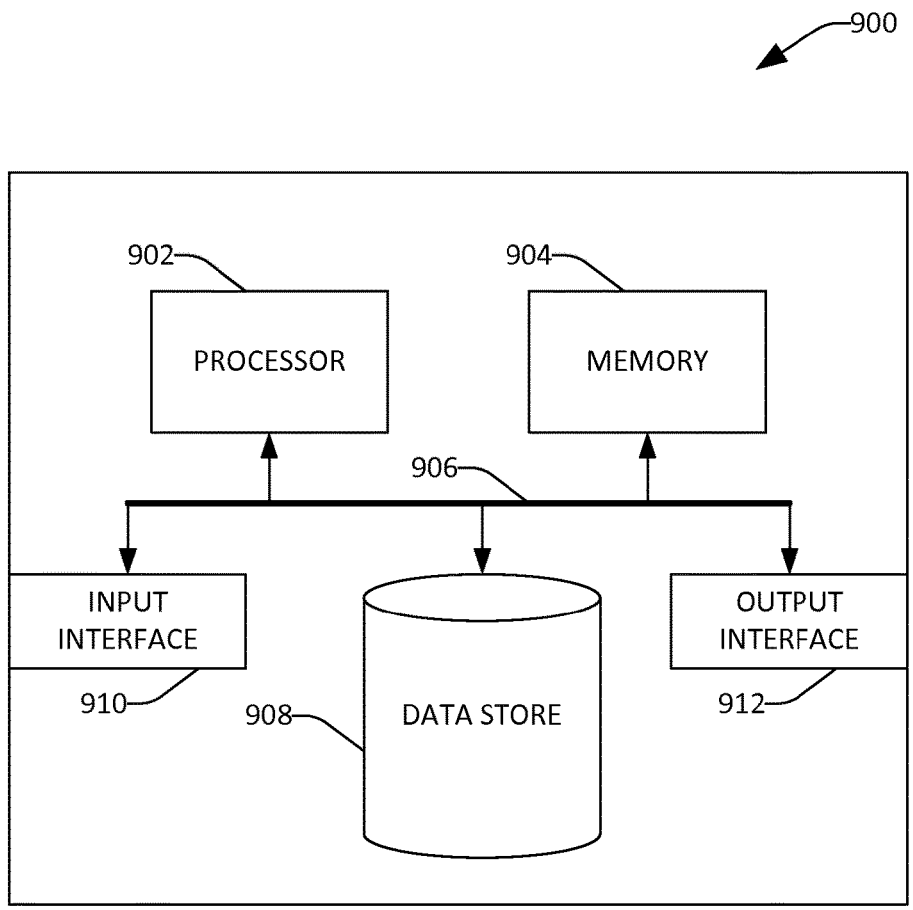
FIG. 9 is an exemplary computing system.

Referring now to FIG. 9, a high-level illustration of an exemplary computing device 900 that can be used in accordance with the systems and methodologies disclosed herein is illustrated. For instance, the computing device 900 may be or be included in the computing system 100. In another example, the computing device 900 may be a computing device that performs acts described as being performed by the search engine 200 or by the search engines 302-304. In yet another example, the computing device 900 may be or be included in the computing system 506, or may be the computing device 502. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store search results, feature values, SERPs, user profiles, etc.

The computing device 900 additionally includes a data store 908 that is accessible by the processor 902 by way of the system bus 906. The data store 908 may include executable instructions, SERPs, feature values, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
a processor; and
memory that comprises instructions that, when executed by the processor, causes the processor to perform acts comprising:
generating a first search engine results page (SERP) that comprises first search results and storing the first SERP in the memory, wherein the first SERP is generated based upon a received query from a user, the first search results in the first SERP are ordered by a search algorithm when the search algorithm has first weights assigned thereto, and further wherein the first search results have first feature values corresponding thereto:
generating a second SERP that comprises second search results and storing the second SERP in the memory, wherein the second SERP is generated based upon the received query and independently from the first SERP, wherein the second search results in the second SERP are ordered by the search algorithm when the search algorithm has second weights assigned thereto that are different from the first weights, and further wherein the second search results have second feature values corresponding thereto;
computing that the first SERP is preferred by the user over the second SERP based upon the first features values that correspond to the first search results, the second feature values that correspond to the second search results, and feature values for the query; and
outputting the first SERP for display rather than the second SERP responsive to the first SERP being computed as being preferred by the user over the second SERP.

2. The computing system of claim 1, wherein the first SERP and the second SERP are generated by a first search engine, the acts further comprising:
computing that the first SERP is preferred by the user over a third SERP, wherein the third SERP is generated by a second search engine based upon the query.

3. The computing system of claim 1, wherein the first SERP and the second SERP are generated by a search engine, the acts further comprising:
computing that the first SERP is preferred over a third SERP, wherein the third SERP is generated by the search engine based upon the query.

4. The computing system of claim 3, the third SERP generated by a first vertical of the search engine.

5. The computing system of claim 1, wherein the first SERP is computed as being preferred by the user over the second SERP based upon a profile of the user.

6. The computing system of claim 5, the profile being indicative of at least one of age or gender of the user.

7. The computing system of claim 1, wherein the first SERP is computed as being preferred by the user over the second SERP based upon historically observed preferences between SERPS in respective pairs of SERPs as set forth by the user.

8. The computing system of claim 1, the features for the query comprising at least one of a number of characters in the query, a number of keywords in the query, a type assigned to the query, a category assigned to the query, a frequency of issuance of the query, or an average result clickthrough rate for the query.

9. The computing system of claim 1, the first features values including relevance values assigned to the first search results in the first SERP, a fraction of the first search results in the first SERP identified as being relevant to the query, or position-weighted mean relevance scores assigned to the first search results in the first SERP.

10. The computing system of claim 1, wherein computing that the first SERP is preferred by the user over the second SERP further comprises:
outputting a value that is indicative of similarity in quality between the first SERP and the second SERP, wherein the first SERP is computed as being preferred by the user over the second SERP based upon the value.

11. A method performed by a processor of a computing system, the method comprising:
generating a first search engine results page (SERP) that comprises first search results and storing the first SERP in memory of the computing system, wherein the first SERP is generated based upon a received query from a user, the first search results in the first SERP are ordered by a search algorithm when the search algorithm has first weights assigned thereto, and further wherein the first search results have first feature values corresponding thereto;
generating a second SERP that comprises second search results and storing the second SERP in the memory, wherein the second SERP is generated based upon the received query and independently from the first SERP, wherein the second search results in the second SERP are ordered by the search algorithm when the search algorithm has second weights assigned thereto that are different from the first weights, and further wherein the second search results have second feature values corresponding thereto;
computing that the SERP preferred by the user over the second SERP based upon the first features values, the second feature values, and feature values for the query; and
outputting the first SERP for display responsive to determining that the first SERP is preferred by the user over the second SERP.

12. The method of claim 11, wherein the first SERP is received from a first search engine, the method further comprising:
receiving a third SERP from a second search engine; and
computing that the first SERP is preferred by the user over the third SERP responsive to receiving the first SERP from the search engine and further responsive to receiving the third SERP from the second search engine.

13. The method of claim 11, wherein computing that the first SERP is preferred by the user over the second SERP comprises:
computing a value that is indicative of a similarity in quality between the first SERP and the second SERP; and
computing that the first SERP is preferred by the user over the second SERP based upon the value.

14. The method of claim 13, wherein computing that the first SERP is preferred by the user over the second SERP further comprises:
comparing the value to a predefined threshold value;
identifying that the value is above the predefined threshold value; and
computing that the first SERP is preferred by the user over the second SERP based upon the value being above the predefined threshold value.

15. The method of claim 11, further comprising:
computing that the first SERP is preferred by the user over multiple other SERPs, the multiple other SERPs generated based upon the query and generated independently from one another.

16. The method of claim 11, wherein the first SERP is computed to be preferred by the user over the second SERP based upon diversity between the first search results in the first SERP and diversity between the second search results in the second SERP.

17. A computer-readable storage medium comprising instructions that, when executed by a processor, cause the processor to perform acts comprising:
receiving a query set forth by a user;
responsive to receiving the query, generating a first search engine results page (SERP) and a second SERP based upon the query and storing the first SERP and the second SERP in memory of a computing system, the first SERP and the second SERP are generated by a search engine that uses a search algorithm to generate search results, wherein the first SERP comprises first search results and the second SERP comprises second search results, wherein the first search results are ranked by the search engine when the search algorithm has first weights assigned thereto, and the second search results are ranked by the search engine when the search algorithm has second weights assigned thereto, and further wherein the first SERP and the second SERP are generated independently from one another;
computing that the first SERP is preferred by the user over the second SERP, wherein computing that the first SERP is preferred by the user over the second SERP comprises:
identifying features values of the query, first feature values that correspond to the first search results, and second feature values that wherein the first SERP is computed to be preferred by the user over the second SERP based upon the feature values of the query, the first feature values, and the second feature values; and
outputting the first SERP for display rather than the second SERP responsive to computing that the first SERP is preferred by the user over the second SERP.

18. The computer-readable storage medium of claim 17, wherein computing that the first SERP is preferred by the user over the second SERP further comprises:
computing a value that is indicative of a similarity in quality between the first SERP and the second SERP; and
computing that the first SERP is preferred by the user over the second SERP based upon the value.

19. The computer-readable storage medium of claim 17, wherein computing that the first SERP is preferred by the user over the second SERP further comprises:
providing the first SERP and the second SERP to a classifier; and
receiving an indication from the classifier that the first SERP is computed to be preferred by the user over the second SERP.

20. The computer-readable storage medium of claim 17, wherein the first SERP is computed to be preferred by the user over the second SERP based upon a profile of the user.

* * * * *